Oct. 31, 1944.   D. M. SMITH   2,361,904
PISTON PACKING
Filed Jan. 6, 1940
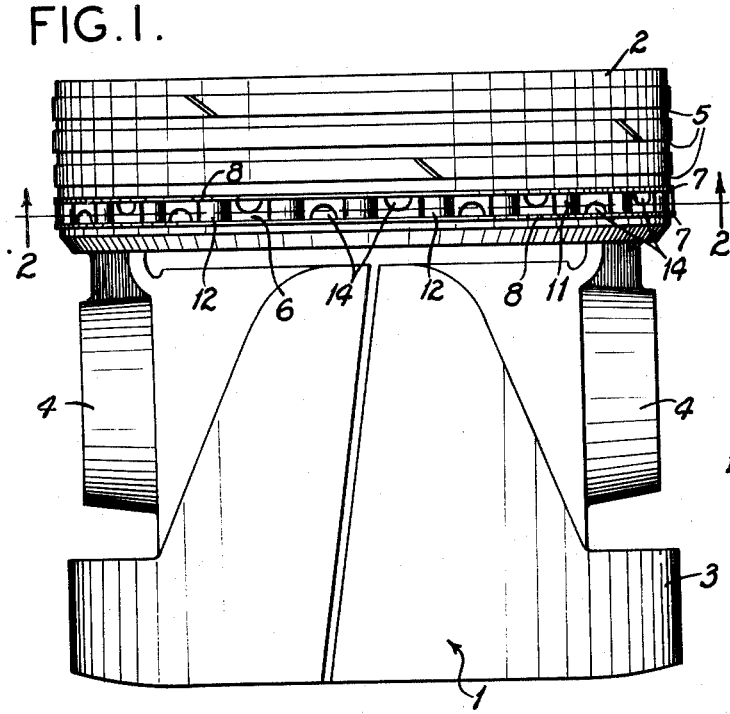
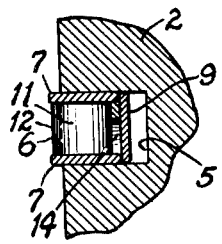
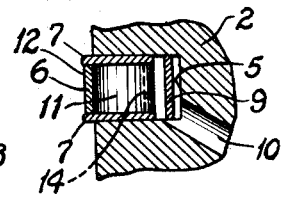
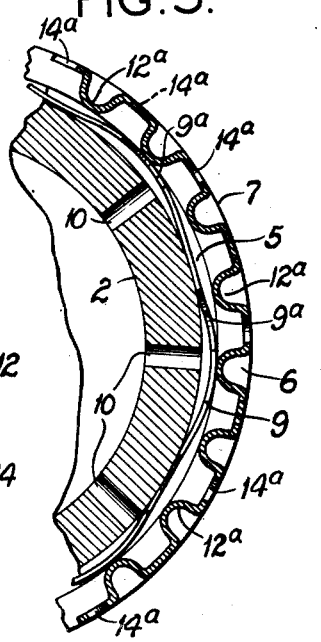
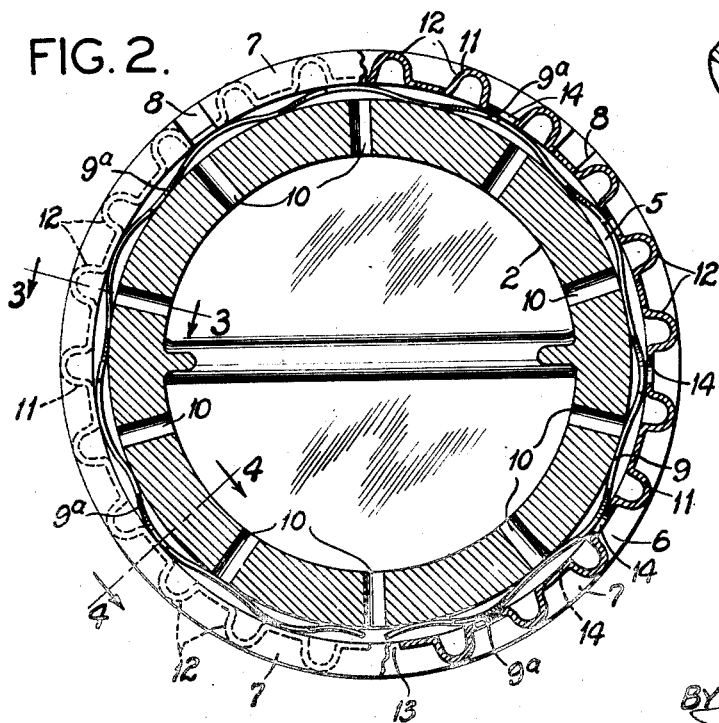
INVENTOR;
DALLAS M. SMITH
BY Henry Kinealy
ATTORNEY Patented Oct. 31, 1944

2,361,904

UNITED STATES PATENT OFFICE 2,361,904

PISTON PACKING

Dallas M. Smith, Kirkwood, Mo., assignor to McQuay-Norris Manufacturing Company, St. Louis, Mo., a corporation of Delaware Application January 6, 1940, Serial No. 312,759

3 Claims. (Cl. 309—45)

My invention relates to piston packings and more particularly to multiple-piece piston packings having a plurality of cylinder contacting surfaces arranged and adapted to provide an effective seal between the piston and the wall of the cylinder in which it reciprocates.

Heretofore, in piston packings comprising a plurality of flat, wafer rings arranged in pairs, with each pair separated by a spacer having oil passages therethrough, the spacer usually was formed by a cast iron ring of generally rectangular cross-section and, therefore, the bounding walls of the oil passages extending through the spacer were of a length equal to the thickness of the ring, that is, they were equal to the radial depth from the front to the rear face of the spacer ring. In many cases carbon collected on these bounding walls and often many, if not all, of the passages through the ring became clogged and obstructed so as to prevent effective operation of the packing structure as an efficient sealing means.

Having in mind these and other structural deficiencies of piston packings as used heretofore, my invention contemplates a piston packing comprising a plurality of resilient ring members formed preferably of ribbon steel and arranged to contact the cylinder wall. Usually positioned between the rear faces of the ring members and the bottom of the ring groove in which the members are used is a ring expander adapted to engage the rear faces of the ring members and to exert radial pressure thereon so that the ring members, in turn, exert a high pressure per unit of contacting area on the cylinder fall. Positioned between each pair of ring members and adapted to separate the ring members from each other is a spacer having an effective radial thickness greater than the thickness of the strip material of which the spacer is formed. The preferred embodiment of the spacer is substantially circular in form and has substantially U-shaped portions arranged at intervals thereon so that the effective cross-sectional area of the spacer is greater than the cross-sectional area of the material itself from which the spacer is made. The spacer preferably is formed of ribbon steel and is positioned between the ring members so that the lateral edges thereof contact the ring members. The U-shaped portions preferably are arranged so that the effective radial thickness of the spacer is slightly less than the radial thickness of the ring members used in the packing structure so that the ring members rest firmly on the spacer. When a piston packing of this kind is used as an oil ring passages are provided in the ring expander and in the spacer so that oil may flow through these passages and through ports provided for this purpose in the piston at the bottom of the ring groove.

Since the ribbon steel of which the spacer is formed is quite thin as compared to its width, the bounding walls of the passages are substantially short since they are only as long as the thickness of the ribbon material of which the spacer is formed, and hence the opportunity for carbon to collect on these radial bounding walls is minimized. If carbon should form in the passages it will attain a thickness no greater than the length of the bounding walls and, therefore, the carbon formation will be thin because the bounding walls of the passages are substantially short. This thin wall of carbon, if it should form in the passages, will be swept away by oil flowing therethrough and the passages, therefore, will not become blocked by carbon forming therein.

Besides overcoming the deficiencies mentioned above of piston packings as used heretofore, a piston packing constructed according to my invention, and as briefly described above, is cheap to manufacture since all the constituent members may be formed of ribbon steel and the only operation required in forming the members is to bend the ribbon steel to proper shape.

Having thus briefly described my invention one object thereof is to provide a multiple-piece piston packing wherein oil passages through the spacer ring will be formed with extremely short bounding walls.

Another object of my invention is to provide a multiple-piece piston packing which may be formed entirely of ribbon material, such as strip steel.

A further object of my invention is to provide a multiple-piece piston packing which may be used as an oil ring.

A more specific object of my invention is to provide a multiple-piece piston packing which is cheap to manufacture and which will provide an effective seal between the piston and the cylinder in which it reciprocates.

Other objects and advantages will be apparent to those skilled in the art from the following description wherein reference is made to the drawing illustrating several preferred embodiments of my invention and wherein similar reference numerals designate similar parts throughout the several views.

In the drawing, Fig. 1 shows a piston provided with a piston packing constructed according to my invention.

Fig. 2 is a horizontal section on the line 2—2 of Fig. 1.

Fig. 3 is a detail vertical section on the line 3—3 of Fig. 2 and

Fig. 4 is a detail vertical section on the line 4—4 of Fig. 2.

Fig. 5 is a partial horizontal section similar to Fig. 2 of a second embodiment of my invention.

Referring to the figures, a piston 1 is shown therein comprising a head 2, a skirt 3, wrist pin bosses 4 and ring grooves 5. The piston, however, may be of any desired kind and constitutes no part of my invention, since the piston is shown here for illustrative purposes only.

As shown in Fig. 1 a ring groove 5 of the piston 1 is provided with a piston packing 6 constructed according to my invention and comprising a pair of narrow resilient ring members 7 formed preferably of ribbon steel and arranged flat-wise in the groove so that the outer circumferential edge of each member contacts the cylinder wall. The ring members 7 have a gap 8 therein between the ends of the ribbon steel of which the ring members are formed so that they may expand and contract as they pass over irregularities in the cylinder wall when the piston reciprocates in the cylinder.

Positioned between the bottom of the ring groove 5 and the rear faces of the ring members 7 is a sinuous expander 9 adapted to exert radial pressure on the ring members 7 so that the ring members, in turn, exert a substantially high pressure per unit of contacting area on the cylinder wall, whereby the ring members effectively remove an adequate amount of oil therefrom. The expander 9 may have passages 9a arranged at intervals therein and adapted to permit excess oil, removed from the cylinder wall by the ring members 7, to pass therethrough to the bottom of the ring groove 5 where it may pass into the interior of the piston 1 through ports 10 therein provided for that purpose.

Positioned between the ring members 7 and adapted to separate the ring members from each other is a spacer 11, which spacer and the construction thereof constitute the essence of my invention.

In the embodiment shown in Figs. 1 to 4, inclusive, the spacer 11 is substantially circular in form and has outwardly curved, substantially U-shaped portions 12 arranged at intervals thereon so that the effective cross-sectional area of the spacer 11 is much greater than the cross-sectional area of the strip of material from which the spacer is made. The spacer 11 preferably is formed of ribbon steel or other similar material and is arranged, as shown, edgewise between the ring members 7 so that only the lateral edges of the spacer contact the ring members. The spacer 11 may have a gap 13 between the ends thereof so that it may expand and contract with the ring members 7 as the ring members encounter irregularities in the cylinder wall.

When the piston packing 6 is to be used as an oil ring, the spacer 11 has formed in the portions thereof between the substantially U-shaped portions 12 a plurality of passages 14 preferably arranged in staggered formation, as shown clearly in Fig. 1, and extending through the material. Excess oil, removed from the cylinder wall by the ring members 7, will drain through these passages 14 into the space behind the packing structure 6 and from there it may drain through ports 10 into the hollow interior of the piston 1. These passages 14 in the spacer 11 may be of any size, shape and arrangement and it will be evident that the bounding walls of the passages 14 will be only as long as the thickness of the ribbon material from which the spacer 11 is formed and, hence, the opportunity for carbon to collect on these radial bounding walls will be minimized. As stated above, if carbon should form in the passages 14, the formation will be substantially thin, since the bounding walls of the passages are short, and the formation, therefore, will not have sufficient strength to withstand the pressure of the oil whereby the carbon formation in the passages will be removed by the oil flowing therethrough. If the passages 14 are arranged between the bent or U-shaped portions of the spacer, they each will lead from one of the series of oil collecting pockets formed at the cylinder contacting face of the packing structure between adjacent bent portions, as shown clearly in Fig. 2.

Other arrangements may be used without deviating from the scope of my invention, and while I describe a particular construction embodying my invention, it is evident that the construction may be varied in many particulars, and I do not limit myself to the form and arrangement shown and described above. For instance, a piston packing 6 constructed according to my invention may include more than two ring members 7, and each pair thereof may be separated by a spacer 11. Also, as shown in Fig. 5, the spacer 11 used to separate the ring members 7 from each other may be formed and arranged so that the U-shaped portions 12a are curved inwardly and then the passages 14a will be positioned in staggered formation in the portions of the expander between the substantially U-shaped portions 12a and in proximity to the cylinder wall. Although I prefer to form all the constituent parts of my piston packing of ribbon steel, other materials also may be used.

What I claim as new and desire to secure by Letters Patent, is:

1. A composite piston ring for internal combustion engines, comprising a pair of split cylinder wall contacting elements disposed to present their edges to a cylinder wall, an inner expanding spring provided with a plurality of parts in radial thrust engagement with said elements, and a spacer element between said cylinder contacting elements comprising a ribbon-like metal element of generally annular outline; said spacer element being corrugated and disposed between said cylinder contacting elements to present its edges thereto and centered on said inner expanding spring with the corrugations in engagement with the parts of the spring, whereby wear between the element and spring is minimized.

2. A composite piston ring for internal combustion engines, comprising a pair of split cylinder wall contacting elements disposed to present their edges to a cylinder wall, an inner expanding spring provided with a plurality of parts in radial thrust engagement with said elements, and a spacer element between said cylinder contacting elements comprising a ribbon-like metal element of generally annular outline, said spacer element being corrugated and disposed between said cylinder contacting elements to present its edges thereto to space the same axially.

3. In a composite ring having a pair of steel cylinder wall contacting elements and an expander coacting therewith, a thin metallic ribbon-like spacer for said elements of generally annular outline having a plurality of relatively small corrugations therein, said spacer being disposed on edge between said elements to space the same and having a plurality of oil drainage openings extending therethrough.

DALLAS M. SMITH.

CERTIFICATE OF CORRECTION.

Patent No. 2,361,904.                   October 31, 1944.

DALLAS M. SMITH.

It is hereby certified that error appears in the printed specification of the above numbered patent requiring correction as follows: Page 1, first column, line 10, after the word "passages" strike out the comma; line 35, for "fall" read --wall--; page 2, first column, line 46, after the period and before "The" insert the following -

> --As clearly shown in the drawings, the U-shaped portions 12 are of substantially the same radial dimension and circumferential extent, and these dimensions are also substantially the same as the axial dimension of the spacer and the intervals between the U-shaped formations.--;

and that the said Letters Patent should be read with this correction therein that the same may conform to the record of the case in the Patent Office.

Signed and sealed this 6th day of February, A. D. 1945.

Leslie Frazer (Seal)                         Acting Commissioner of Patents.